United States Patent
Dieberger et al.

(10) Patent No.: US 7,979,524 B2
(45) Date of Patent: Jul. 12, 2011

(54) SYSTEM AND METHOD FOR DISCLOSING RELATIONS BETWEEN ENTITIES IN SUPPORT OF INFORMATION TECHNOLOGY SYSTEM VISUALIZATION AND MANAGEMENT

(75) Inventors: Andreas Dieberger, Los Gatos, CA (US); Sandeep Gopisetty, Morgan Hill, CA (US); Eben Haber, Cupertino, CA (US); Eser Kandogan, Mountain View, CA (US); Cheryl A. Kieliszewski, San Jose, CA (US); Sudhir Koka, Sunnyvale, CA (US); Chung-Hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/752,496

(22) Filed: May 23, 2007

(65) Prior Publication Data

US 2008/0294672 A1  Nov. 27, 2008

(51) Int. Cl.
*G06F 15/173* (2006.01)
*G06F 15/16* (2006.01)

(52) U.S. Cl. ......... 709/223; 709/224; 709/225; 709/229

(58) Field of Classification Search .......... 709/223–225, 709/229
See application file for complete search history.

(56) References Cited

U.S. PATENT DOCUMENTS

| | | | | |
|---|---|---|---|---|
| 5,586,254 | A * | 12/1996 | Kondo et al. | 714/25 |
| 6,665,714 | B1 * | 12/2003 | Blumenau et al. | 709/222 |
| 7,167,483 | B1 * | 1/2007 | Sharma et al. | 370/442 |
| 2001/0020254 | A1 * | 9/2001 | Blumenau et al. | 709/229 |
| 2002/0124115 | A1 * | 9/2002 | McLean et al. | 709/310 |
| 2006/0271677 | A1 * | 11/2006 | Mercier | 709/224 |
| 2008/0005156 | A1 * | 1/2008 | Edwards et al. | 707/102 |

* cited by examiner

*Primary Examiner* — Phuoc Nguyen
*Assistant Examiner* — Clarence John
(74) *Attorney, Agent, or Firm* — Shimokaji & Associates PC; Samuel Kassatly (57) ABSTRACT

A relationship visualization system provides a user interface by which a user may select from among entities, elements, and sub-elements as an initial point in a desired relationship for display. The system designates the selected entities, elements, and sub-elements originating endpoints for the desired relationship. The system displays the relationship between entities, elements, and sub-elements to facilitate visualization and management of the information technology system. The relationship comprises a data path. The display of the relationship comprises a graphical view and a tabular view.

35 Claims, 9 Drawing Sheets

SYSTEM AND METHOD FOR DISCLOSING RELATIONS BETWEEN ENTITIES IN SUPPORT OF INFORMATION TECHNOLOGY SYSTEM VISUALIZATION AND MANAGEMENT

FIELD OF THE INVENTION

The present invention generally relates to disclosing information and more particularly to progressively disclosing information regarding a relationship between entities in an information technology system in support of information technology system visualization and management.

BACKGROUND OF THE INVENTION

Computer networks have evolved from isolated intranets to a worldwide system of routers, switches, servers, computers, and network devices comprising millions of network devices. A network device is any electronic device capable of communicating over a network with other electronic devices using a communications protocol, for example TCP/IP. Large organizations or enterprises such as banks, insurance companies, and government entities manage internal networks or intranets comprising thousands of network devices.

The success of an enterprise depends on the successful management of its network devices. Successful management of network devices allows individuals in distant offices to communicate via email and voice over IP (VoIP) and also allows large enterprise information systems (EIS) to manage data throughout an organization. Unsuccessful management of an organization's resources results in disastrous interruptions in the basic functions of the organization. For example, the failure of a bank's network prevents automated teller machined (ATMs) from dispensing cash to customers and bank tellers from servicing the needs of walk-in bank customers.

An enterprise typically empowers a small department of network administrators with the task of managing its thousands of network devices. Success is measured by the number of hours per year that the network is available to all users of the network. Information technology (IT) management software exists to assist the network administrator in monitoring and managing the routers, switches, hubs, servers, and computers in an enterprise intranet. Typical IT management software packages display the status of individual routers, switches, and servers. For example, an administrator may review the system load experienced by a critical router using an IT management software tool. The tool may display the status of each link connected to the router and the traffic rate over each link. Advanced tools may alert the administrator to specific critical conditions, displaying a router whose utilization level is above 90% of capacity in red while displaying routers operating at 80% of capacity in yellow.

Another conventional IT management software tool is a general topology viewer that provides custom groupings of network devices according to user-selected attributes. Although this technology has proven to be useful, it would be desirable to present additional improvements. The overall purpose of an enterprise is to move data between entities such as computer hosts and volumes in storage subsystems. Relations between entities can be described as a data path; the data path is the series of entities and connections through which data flows between a particular host and volume. The general topology viewer finds information about a single entity and connections to its immediate neighbors. However, the details of connections between many entities are more difficult to display. To view a data path with the general topology viewer, the user is required to drill down to each entity in the path, then drill up again before moving to the next entity. The user either views too little detail from a high-level perspective of a system, or too much detail with many low-level entities, with no filtering of the entities presented within their relationships to one another.

What is therefore needed is a system, a service, a computer program product, and an associated method for disclosing relations between entities in support of information technology system visualization and management. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for disclosing relations between entities in support of information technology system visualization, and management that could be used as a tool for troubleshooting and analysis.

The present system provides a user interface by which a user may select from among entities, elements, and sub-elements as an initial point in a desired relationship for display. The present system designates the selected entities, elements, and sub-elements originating endpoints for the desired relationship. The present system displays the relationship between entities, elements, and sub-elements to facilitate visualization and management of the information technology system. The relationship comprises a data path. The display of the relationship comprises a graphical view and a tabular view.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is comprised of FIGS. 7A, 7B, and 7C and represents a diagram illustrating a screen shot of a relationship in the form of a data path between elements of entities displayed by the relationship visualization system of FIGS. 1 and 3.

DETAILED DESCRIPTION OF PREFERRED EMBODIMENTS

The following definitions and explanations provide background information pertaining to the technical field of the present invention, and are intended to facilitate the understanding of the present invention without limiting its scope:

Data Path: a path along which data flows from one entity, element, or sub-element to another entity, element, or sub-element. A data path comprises communication links, computers, storage volumes, switches, ports, etc. A data path could be or include a logical path.

Entity: A set of elements or sub-elements with a common attribute that allows the group of elements or sub-elements to be grouped. An entity, for example, may be a network or fabric comprising fabric elements; a data initiator comprising computers; and a data target comprising data subsystems.

Element: A set of sub-elements associated with an element that supports the function of the element. An element, for example, may be a computer comprising sub-elements such as disks and ports; a fabric comprising sub-elements such as switches and ports, or a data storage subsystem comprising sub-elements such as a data volume and ports.

Fabric: physical or logical connections between entities and elements in a network.

Intermediate endpoint: An entity, element, or sub-element designated by a user or by the present system as an intermediate point of a data path to designate a data path or data paths to be graphically represented.

Interconnected entities: Entities that include network switches, network ports, host ports, fabric ports, controller ports, disks, tape libraries, computers, virtual computers, or any entity that might be represented in a topology viewer.

Local Area Network: a collection of inter-connected entities with a purpose of moving data between computer hosts and computers.

Originating endpoint: An entity, element, or sub-element designated by a user or by the present system as an originating point of a data path. The originating endpoint may be any entity, element, or sub-element in a network or system represent by the present system.

Relationship: a logical or physical association between entities, elements, or sub-elements. A data path is an example of a relationship.

Segment: a unit portion of a data path, for example, a sub-element connected to another sub-element by a communication link.

Storage Area Network: a collection of inter-connected entities with a purpose of moving data between computer hosts and volumes in storage subsystems.

Figure 1:
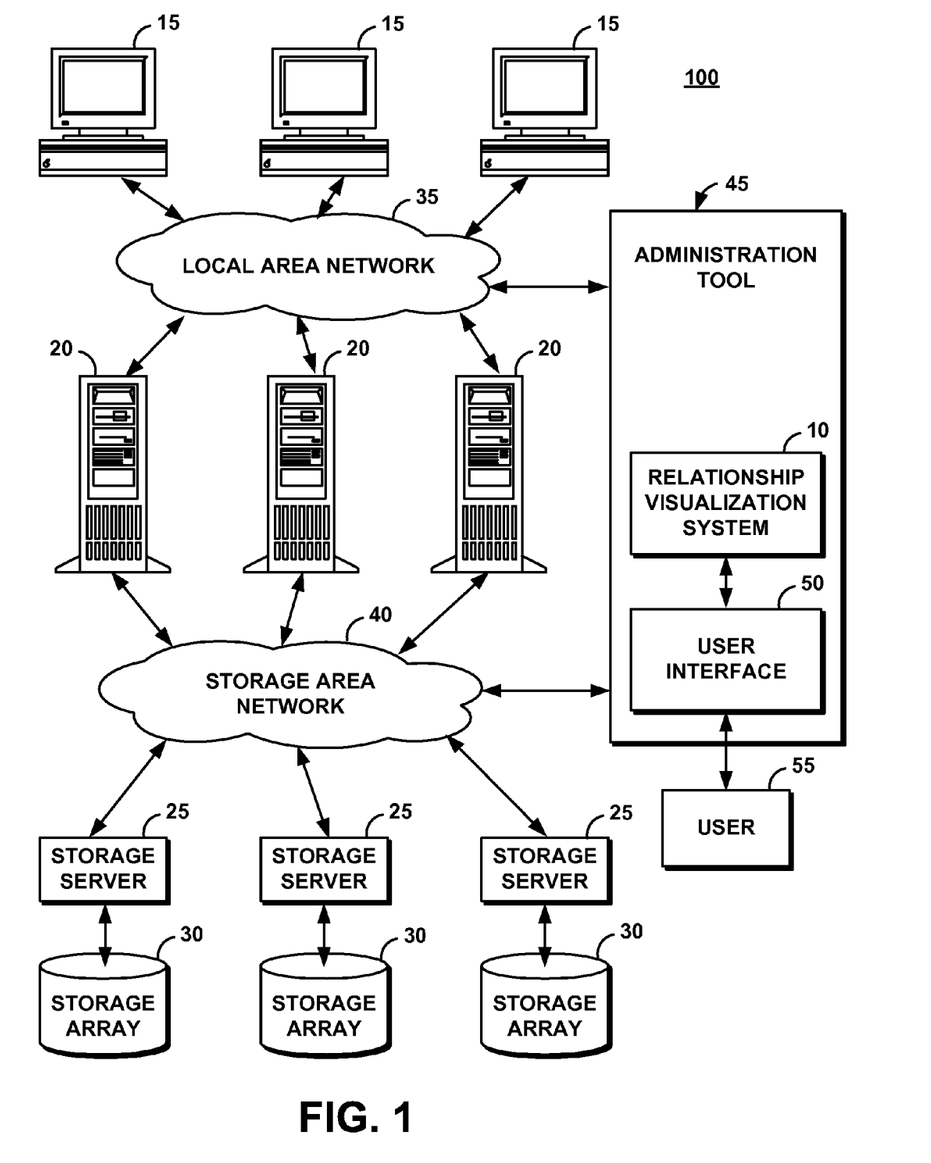
FIG. 1 is a schematic illustration of an exemplary operating environment in which a relation visualization system of the present invention can be used.

FIG. 1 portrays an exemplary overall environment in which a system, a computer program product, and an associated method (the relation disclosure system 10 or "system 10") for disclosing relations between entities in support of information technology system visualization and management according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 1 0. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Many of the functional units described in this specification have been labeled as modules to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module could be or include a logical unit. For instance, a computer could be a simulated machine.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 1 depicts a distributed network system 100 comprising a computer network 20, an administration tool 25, and host server 15.

The computer network 20 may comprise, for example, a private intranet or a shared network. The shared network may comprise an intranet, an extranet, or the entire Internet. For exemplary purposes only, the computer network 20 is shown comprising storage arrays 30, 31, 32, storage servers 35, 36, 37, computers 40, 41, 42, servers 45, 46, 47, a local area network (LAN) 50, a storage area networks (SAN) 55, and the like. Although network 20 is often referred to as a computer network 20, the network 20 need not comprise computers. The network 20 of FIG. 1 may also connect to a wide area network, to other networks, to associated intranets, extranets, or to the Internet.

Each device on the network 20 is one of a set of network devices 60 (individually referred to herein as a network device 60). The network devices 60 may be one or more storage arrays 30, 31, 32, one or more storage servers 35, 36, 37, one or more computers 40, 41, 42, one or more servers 45, 46, 47, or other devices capable of communication over a network such as a local area network (LAN) 50 or the storage area network (SAN) 55.

Devices such as the storage servers 35, 36, 37, the computers 40, 41, 42, servers 45, 46, 47, server 15, and storage arrays 30, 31, 32 are generally termed resources or managed resources. A resource or a managed resource may be a computing resource or may comprise one or more computing resources. The storage servers 35, 36, 37 and the storage arrays 30, 31, 32 are computing resources. The storage arrays 30, 31, 32 may communicate on network 20 to the storage servers 35, 36, 37. Alternatively, the storage arrays 30, 31, 32 may connect directly to a storage server via a point-to-point fiber-optic channel, a bus and tag channel, a high-speed serial connection, an extended integrated drive electronics (EIDE) connection, or other direct connection. In other words, some computing devices such as the storage arrays 30, 31, 32 may not be visible on the network 20. However, such computing devices may be monitored and managed over a network.

Typically, a single enterprise manages its own network 20 (interchangeably referred to herein as the enterprise network 20) as an intranet for the use of its own employees. The enterprise network 20 may comprise hundreds, thousands, or tens of thousands of network devices 60. An enterprise may assign a one or more of employees or IT administrators indicated in FIG. 1 as user 65 (interchangeably referred to herein as the IT administrator 65) to manage its network 20. The IT administrator 65 uses various networking tools to monitor and manage the enterprise network 20.

An enterprise such as a commercial business, a government entity, or other organization uses a network such as network 20 to carry out the purposes of the enterprise. An enterprise may store customer data, account information, business plans, databases, and the like on the storage arrays 30, 31, 32 accessible over the enterprise network 20. The enterprise network 20 may carry voice traffic as well as data traffic. Failure of network 20 may cripple the enterprise. Many enterprises depend on their networks to be down for no more than a few hours each year.

The IT administrator 65 monitors all aspects of the enterprise network 20 and the network devices 60 attached to the network 20 using the administration tool 25 and system 10. One embodiment comprises a user interface 70. The administration tool 25 allows the IT administrator 65 to examine the large numbers of network devices 60 in the network 20 using an attribute-centric view of the network devices 60.

An attribute-centric view provides the IT administrator 65 with one or more attributes associated with each of the network devices 60. For example, a server 45, 46, 47 may have several attributes including operating system type, operating system patch level, machine type, physical location, user-defined types, installed memory capacity, free disk space, and the like. The administration tool 25 provides a user interface 70 though which the IT administrator 65 selects one or more attributes. The attributes provided by the administration tool 25 may be dynamically determined by the administration tool 25. The administration tool 25 may gather attributes and attribute values based on the attributes and attribute values possessed by the network devices 60 in the network 20. The administration tool 25 displays in the user interface 70 an attribute-centric view of the network 20 organized in accordance with the selected attributes.

The administration tool 25 assists the IT administrator 65 in monitoring and analyzing the network devices 60 and the computing resources in the network 20. The administration tool 25 allows the IT administrator 65 to monitor thousands of computing resources and manage the computing resources. Using an attribute-centric approach, the IT administrator 65 may easily view all of the computing resources and the network devices 60 comprising a single attribute or comprising a selected group of attributes. The IT administrator 65 may also use the administration tool 25 to quickly receive summary information about groups of the network devices 60 and subgroups of the network devices 60. In addition, the IT administrator 65 may issue commands to groups of the network devices 60 according to the selected attributes.

Figure 2:
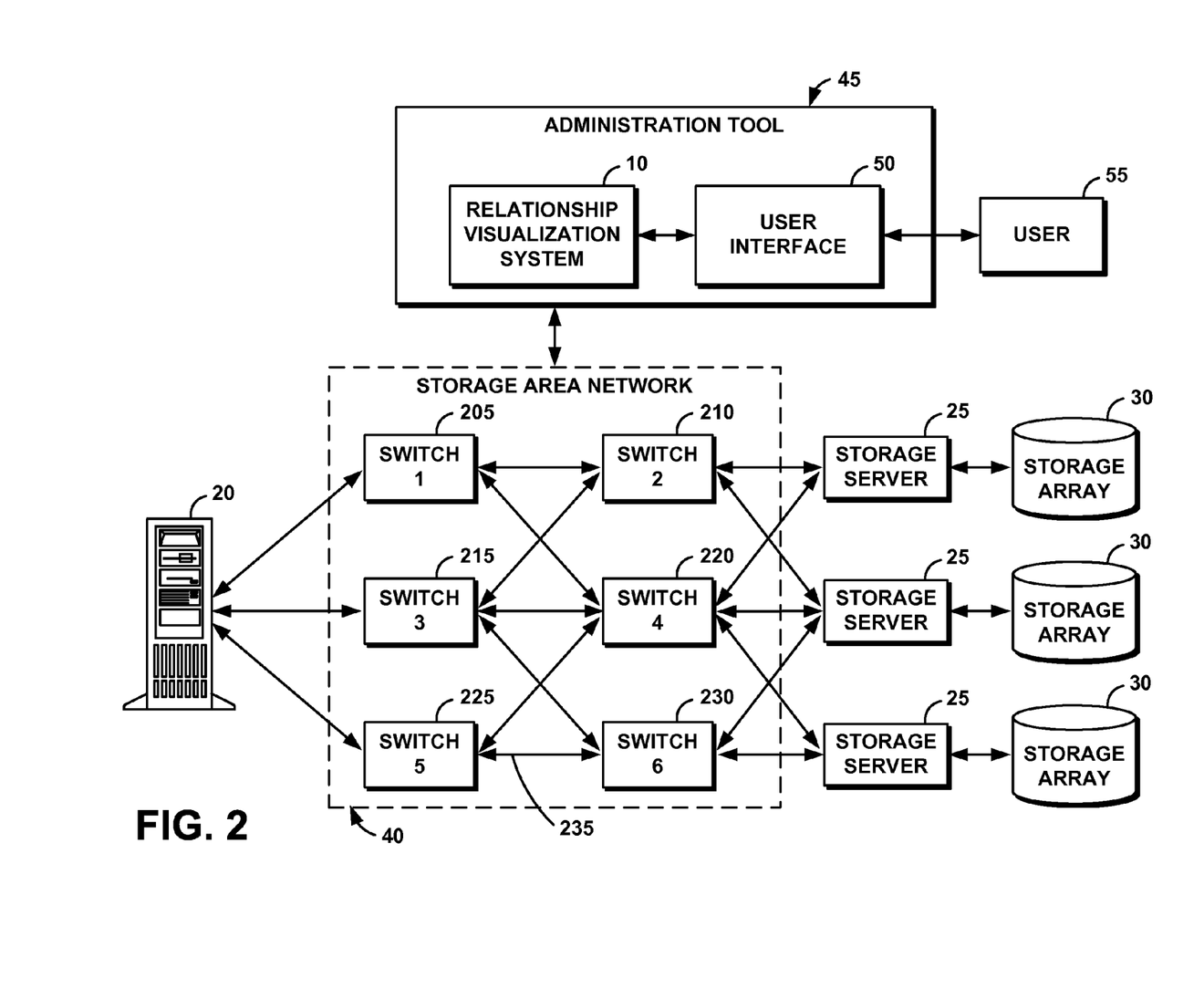
FIG. 2 is a schematic illustration of communication links and switches in an exemplary operating environment in which a relationship visualization system of the present invention can be used.

FIG. 2 shows a schematic illustration of communication links and switches in the storage area network 55. The storage area network 55 comprises switches such as, for example, a switch 1, 205, a switch 2, 21 0, a switch 3, 215, a switch 4, 220, a switch 5, 225, and a switch 6, 230, collectively referenced as switches 235. Server 45, switches 235, the storage servers 35, 36, 37, and the storage arrays 30, 31, 32 are connected by means of communication links such as communication links 240. While only one server 45 is illustrated in FIG. 2, it should be understood that more than one server could alternatively be used.

System 10 displays relationships between entities such as server 45, storage servers 35, 36, 37, and storage arrays 30, 31, 32. This relationship may be portrayed as a data path, i.e., a path along which data is transmitted from server 45 to the storage arrays 30, 31, 32 and from the storage arrays 30, 31, 32 to server 45. For example, the data may flow from server 45 to the storage array 30 along a data path 245 comprising a communication link 250, the switch 3, 215, a communication link 255, the switch 4, 220, a communication link 260, the storage server 35, a communication link 265.

Figure 3:
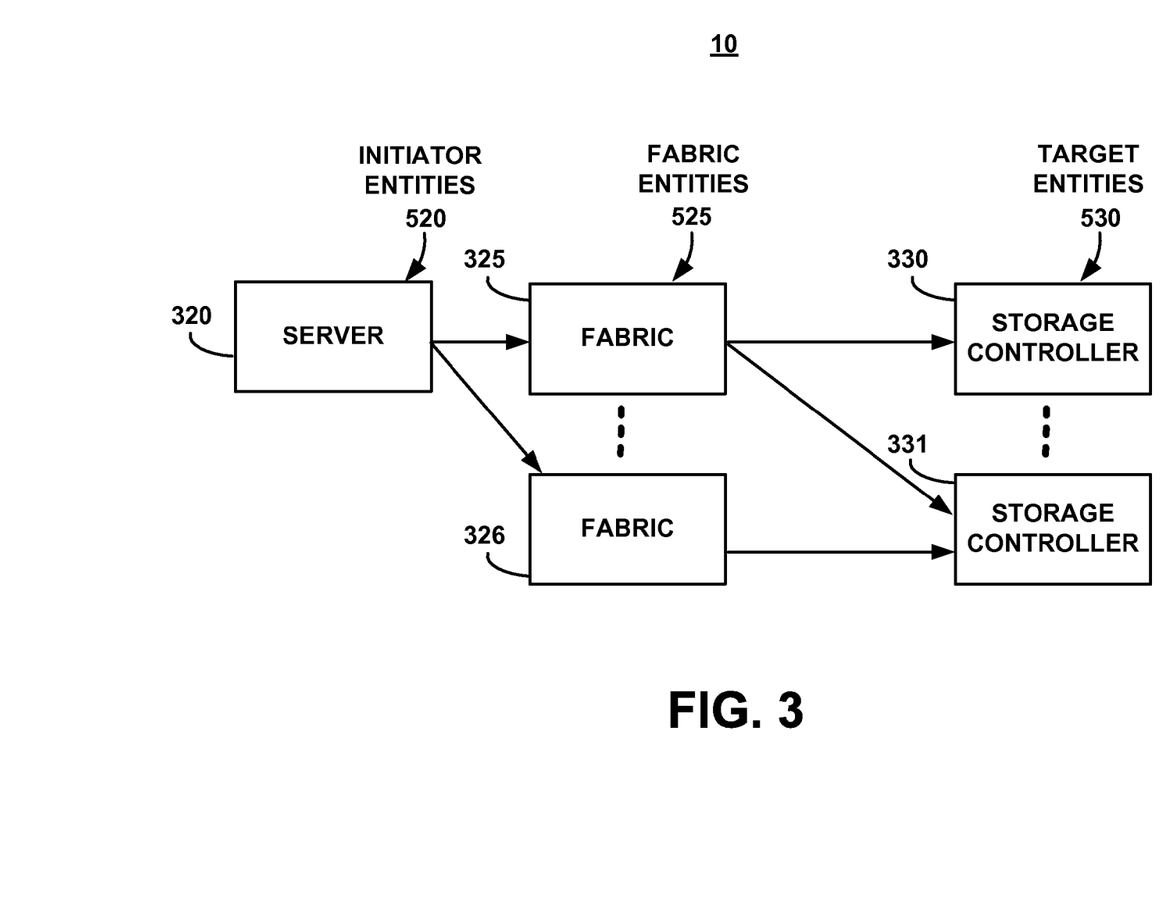
FIG. 3 is a block diagram of the high-level architecture of the relationship visualization system of FIG. 1.

FIG. 3 illustrates a high-level hierarchy of an exemplary system 10. System 10 includes at least one initiator entity 515 that includes at least one server 320. System 10 further includes a plurality of fabric entities 520, two which 325, 326, are illustrated. System 10 further includes at least one target entity 525, illustrated herein as two storage controllers 330, 331.

Figure 4:
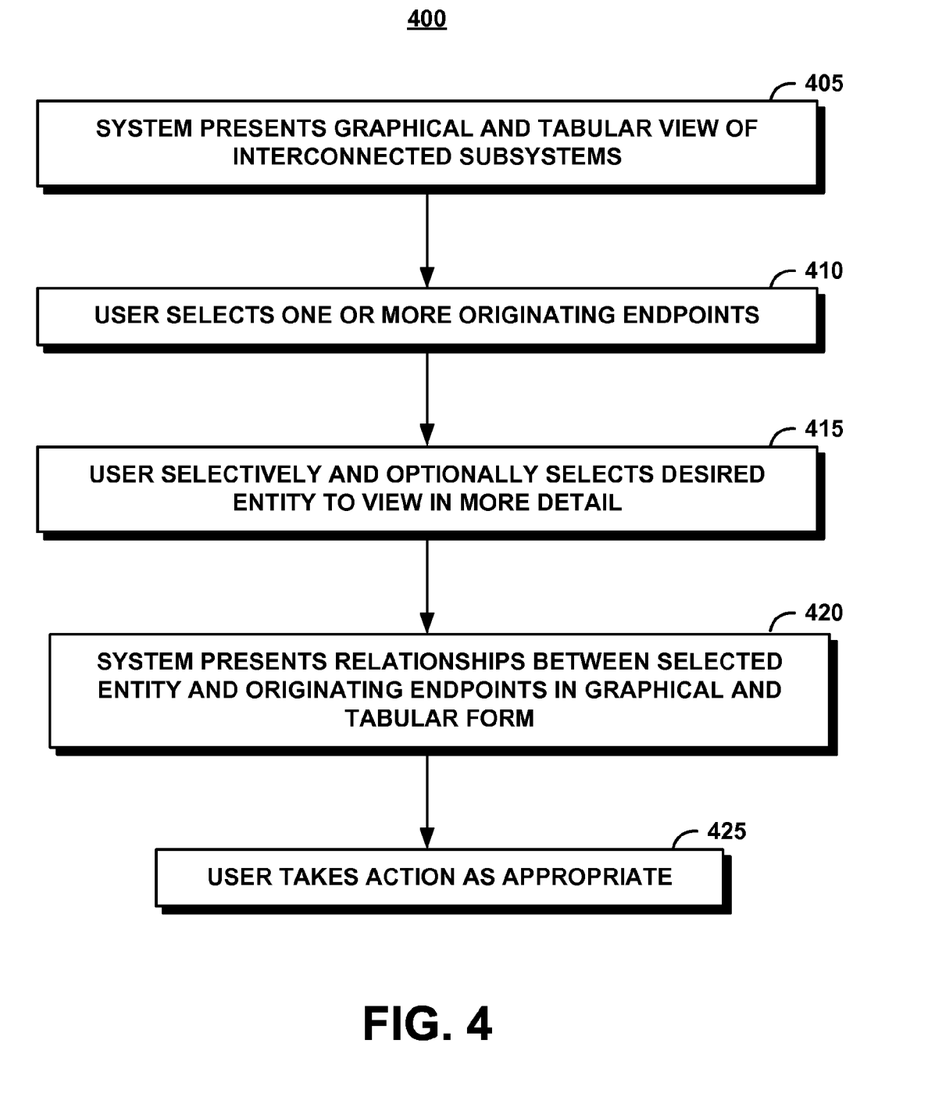
FIG. 4 is a process flow chart illustrating a method of operation of the relationship visualization system of FIGS. 1 and 3.

FIG. 4 illustrates a method 400 of system 10 in displaying relationships between entities to the user 65. System 10 presents to user 65 via the user interface 70 a graphical and tabular view of interconnected entities such as, for example, network 20 of FIG. 1 (step 405). User 65 selects one or more entities, elements, or sub-elements as endpoint(s) of a desired data path or set of data paths (step 410). System 10 designates the selected entities, elements, or sub-elements as originating endpoint(s) (step 415). User 65 selectively and optionally selects a desired entity within the desired data path to view in more detail (step 420). System 10 displays relationships between the selected entity and the selected originating endpoint(s) in graphical and tabular view (step 425). User 65 takes action as appropriate (step 430). For example, user 65 observes the performance of entities within the selected data path, user 65 takes action based on the observed performance, user 65 generates a report; etc. In taking action, user 65 may note that a switch has failed, and reroute the data path through a healthy switch.

User 65 may specify one or more entities within the system to explore all data paths that pass through any of those points. This scenario is akin to an electrician clamping an Ohmmeter to a something and probing other parts of a system to check whether there is a conducting path from the first point to the probe point.

The user may specify two or more entities, elements, or sub-elements to explore only data paths that pass through all of those entities, elements, or sub-elements. This scenario may be used to determine all possible connections between a host and a storage subsystem, for example.

In one embodiment, system 10 notifies user 65 when no valid path exists for the specification (i.e., the initiator entity or target entity) provided by user 65. In another embodiment, system 10 represents as much of the path as possible connecting the specified entity or entities. Such a representation allows user 65 to analyze the partial paths and potentially fix the path if so desired. An example is a storage area network where a specific host cannot see a specific database or volume because zoning is not correctly configured. To further this particular scenario, the user interface 70 can then provide a function to fix the problem, for instance to set up zoning so that the host can see the given subsystem. This is possible because system 10 knows the end points that are expected to communicate with each other (the host and the subsystem). It should be understood that the end points form part of the fabric entities, with certain of these fabric entities being designated as initiator entities and other fabric entities being designated as target entities.

System 10 represents each of the specified data paths with the necessary detail and context for entities along the data path. However, it is not necessary to show all of these separate paths in full detail at the same time. System 10 displays the set of data paths in a higher-level view of all entities through which any path flows. From this view, user 65 can select a particular entity and drill down to a more detailed view that shows only those paths passing through the selected entity. System 10 lets user 65 easily switch between the various paths in a "bundle" of defined paths. The individual paths are represented as path segments and relevant attributes of these path segments are shown using "overlays". This representation allows user 65 to sort the collection of path segments by criteria such as health status or performance.

Figure 5:
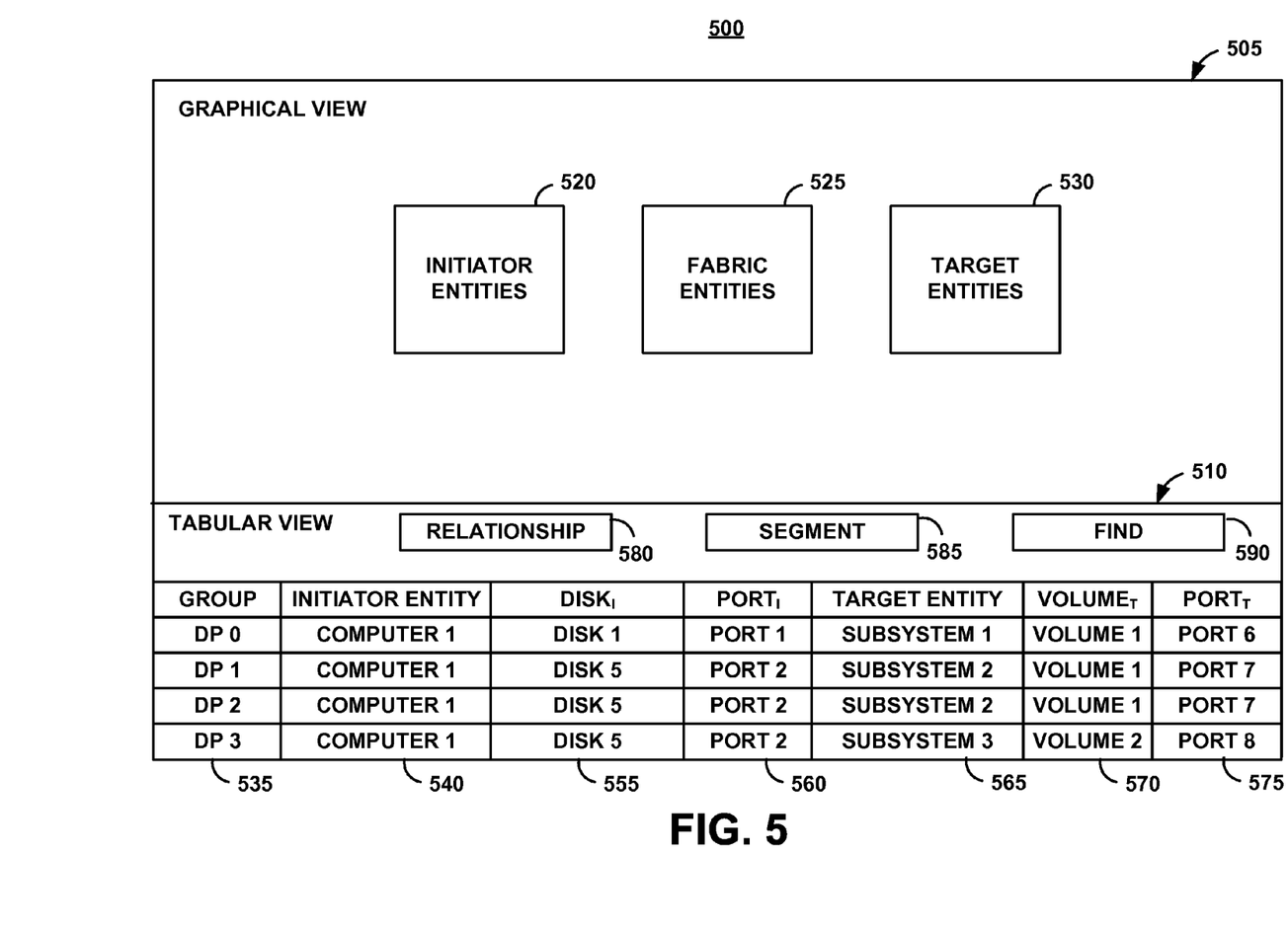
FIG. 5 is a diagram illustrating a screen shot of a graphical and tabular view of entities displayed by the relationship visualization system of FIGS. 1 and 3.
Figure 6:
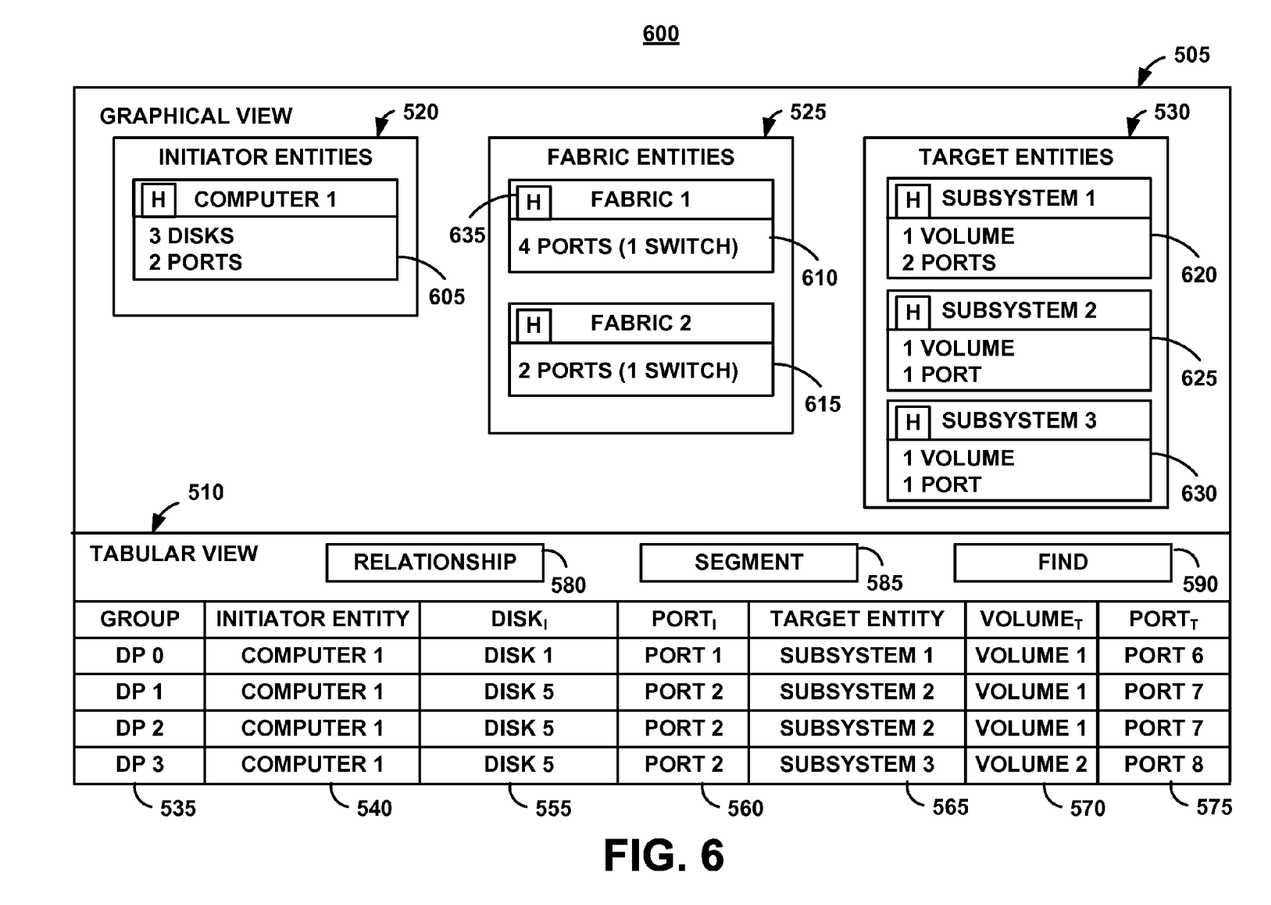
FIG. 6 is a diagram illustrating a graphical view of expanded entities displayed by the relationship visualization system of FIGS. 1 and 3.
Figure 7A:
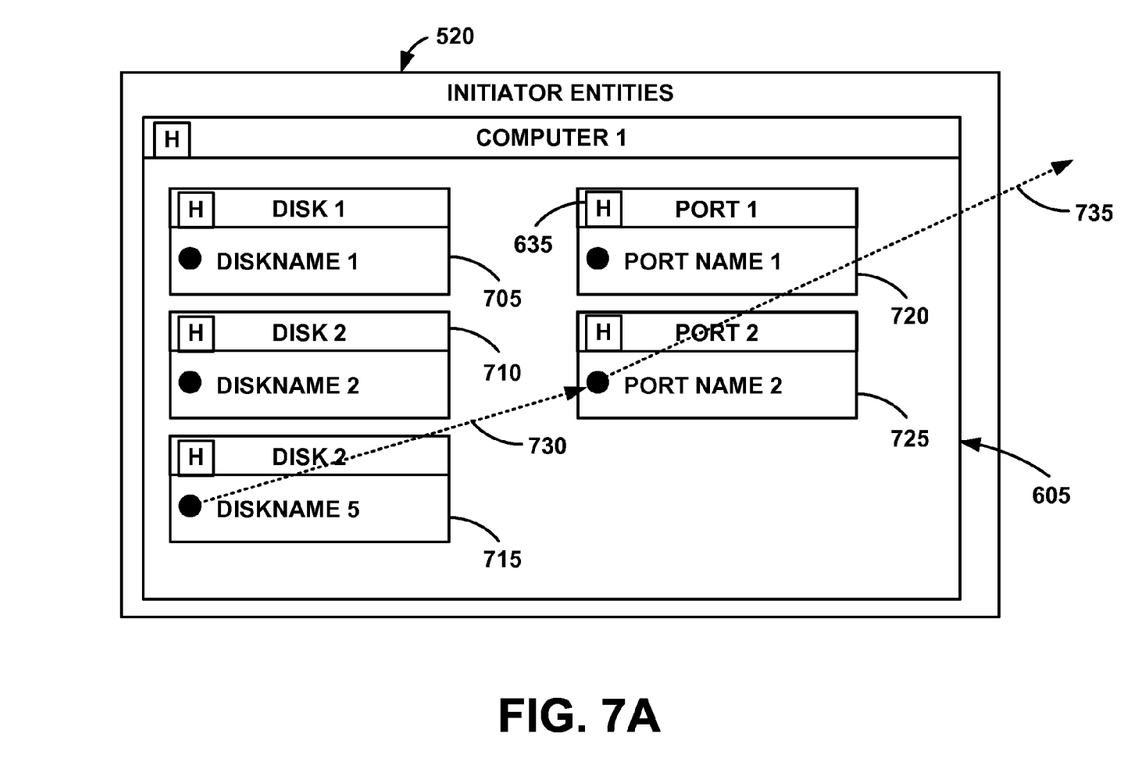
Figure 7B:
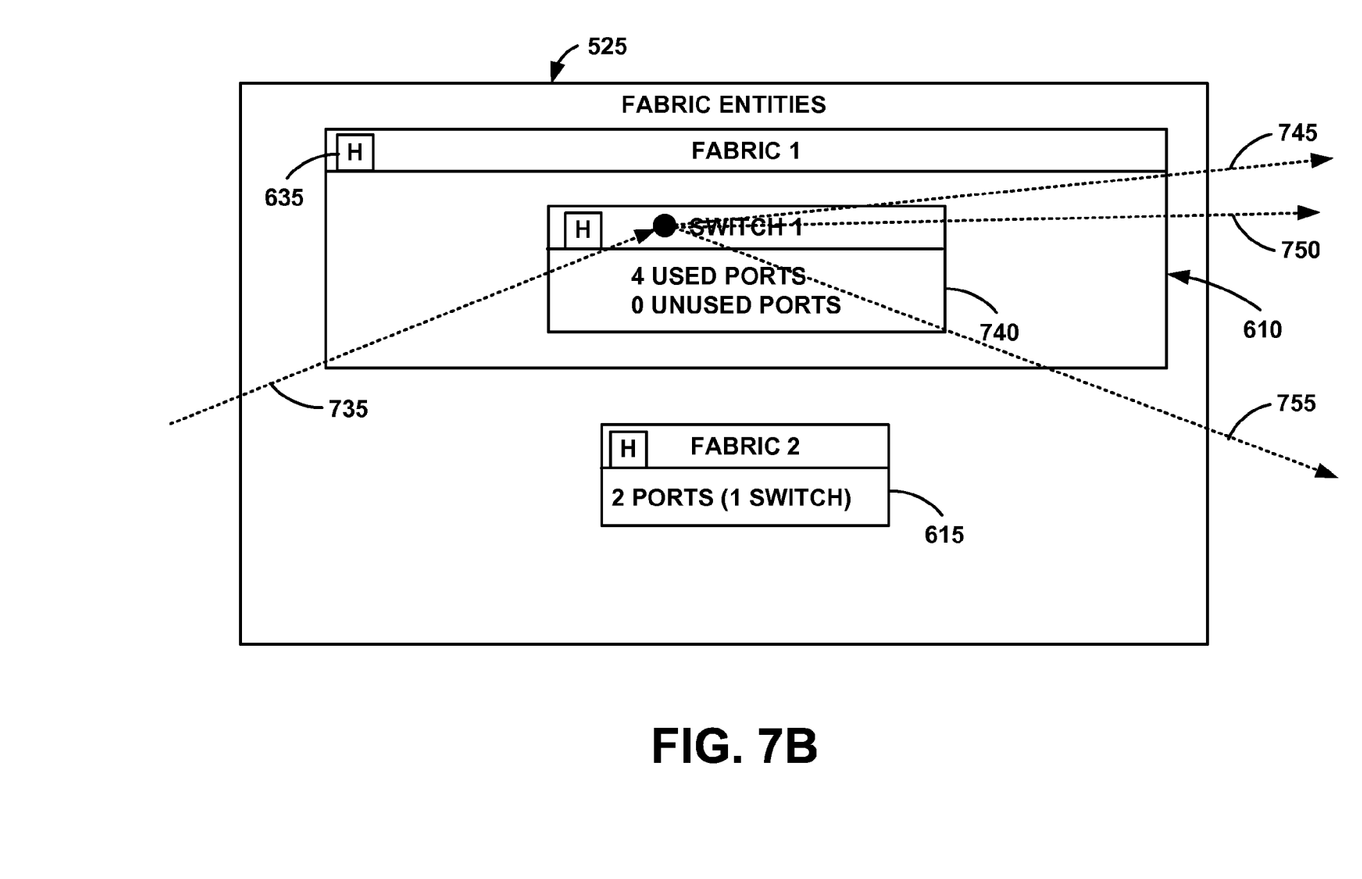
Figure 7C:
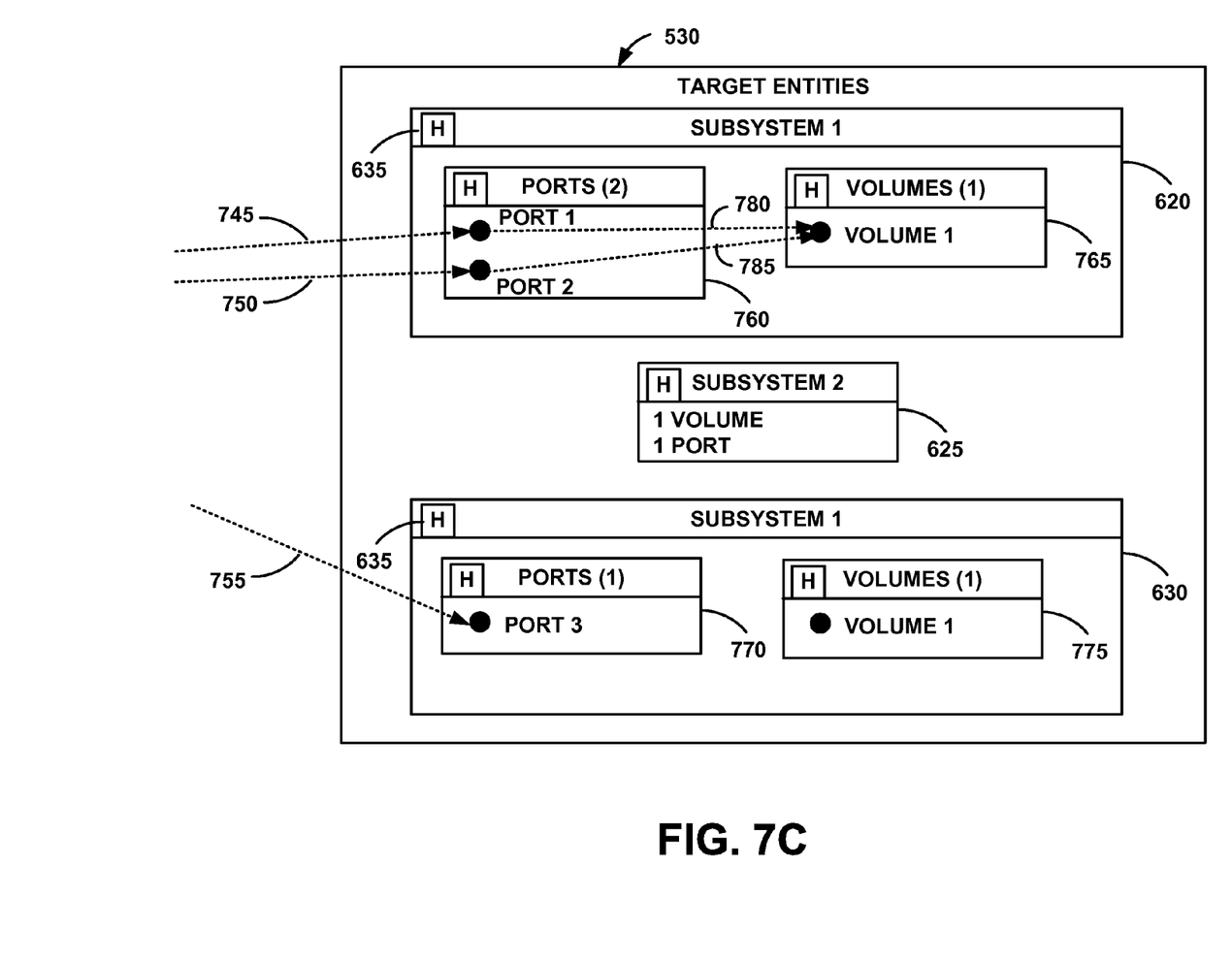

For simplicity reasons, FIG. 05, FIG. 06, and FIG. 07 represent network 102 as containing three tiles along a data path. However, the principle demonstrated by system 10 can be extended to any number of tiles to accommodate more complex data paths. Such paths occur, for instance, in situations where storage is virtualized or where system 10 visualizes complex replication setups.

FIG. 5 illustrates an exemplary screen shot 500 of a graphical view 505 and a tabular view 510 of entities displayed by system 10. A network such as network 20 is shown in high-level abstract form in the graphical view 505 as initiator entities 515 (shown in more detail in FIG. 7A), fabric entities 520 (shown in more detail in the filtered view of FIG. 7B), and target entities 525 (shown in more detail in the filtered view of FIG. 7C).

Entities of the network displayed in the screen shot 500 are shown in more detail in columns of the tabular view 510. Each row in the tabular view 510 represents a relationship or data path between elements and sub-elements of the initiator entities 515, the fabric entities 520, and the target entities 525. The tabular view 510 comprises exemplary columns such as, for example, a group 530, an initiator entity 535, an initiator disk ($disk_I$) 540, an initiator port ($port_I$) 545, a target entity 550, a target volume ($volume_T$) 555, and a target port ($port_T$) 560. Rows in the tabular view 510 can be sorted by column headings.

In one embodiment, system 10 shows data paths using representations comprising the graphical view 505 and the tabular view 510. Each of these representations has certain advantages for different troubleshooting scenarios. For instance, user 65 can quickly follow a path in the graphical view 505; the tabular view 510 makes it easier to sort paths by various criteria such as, for example, throughput in a particular section along a data path. Furthermore, the tabular view 510 provides an accessible representation of data paths for users with special needs, such as visually impaired users. The tabular view 510 further reveals additional information about parts of the data path that is difficult to represent in the graphical view 505. For example, each entity in the data path may be associated with a plethora of attributes, only some of which need to be represented in the graphical view 505. However, the tabular view 510 can list these attributes easily and in a space effective fashion.

Additional functions are provided such as a relationship 565, a segment 570, and a find 575. When looking at the entire path in one row of the table it is not possible to show all detail information for every part of the path, in that the entire path contains a substantial amount of information. Rather, when individual segments are displayed, they are shown as a table and then each part (or segment) of the path occupies an entire row in the table that can contain additional information. User 65 may select segment 570 to view further information about segments of a relationship or data path. Selecting segment 570 expands information presented in the tabular view 510 such that each row corresponds to a segment in the data path. For one or more paths selected, this tab contains a list of "hops" through a displayed topology with detailed information about each segment.

FIG. 6 illustrates an exemplary screen shot 600 in which the user has expanded the initiator entities 51 5, the fabric entities 520, and the target entities 525 to display more detail. In the exemplary network displayed in screen shot 600, the initiator entities 515 comprise an element computer 1, 605. Sub-elements associated with the computer 1, 605, comprise 3 disks and 2 ports. The fabric entities 520 comprise elements: a fabric 1, 610, and a fabric 2, 615. The target entities 525 comprise elements: a subsystem 1, 620, a subsystem 2, 625, and a subsystem 3, 630. The computer 1, 605, the fabric 1, 610, the fabric 2, 615, the subsystem 1, 620, the subsystem 2, 625, and the subsystem 3, 630, are collectively referenced as elements 635. Each of the elements 635 may comprise sub-elements that can be viewed when expanded.

Each of the elements has an associated health indicator represented generically as health indicator (H) 640. The health indicator 640 indicates a functional status of an element; i.e., whether the element is operational, is not operational, or is functioning at some reduced capacity. If an element comprises sub-elements, the health indicator 640 is an aggregate of the functional status of the sub-elements. For example, the fabric 1, 610, is shown comprising four ports, one of which is a switch. The health indicator 640 is an aggregate of the health of each of the four ports.

FIG. 7 (FIGS. 7A, 7B, 7C) illustrates an view of the initiator entities 515, the fabric entities 520, and the target entities 525 expanded to display relationships between the elements 635 and sub-elements of the of the initiator entities 515, the fabric entities 520, and the target entities 525. In the example of FIG. 7, the relationships are data paths. System 10 filters the displayed elements of the overall network such that only those elements associated with the data path are displayed.

The expanded view of the initiator entities 520 (FIG. 7A) comprises the element computer 1, 605. The computer 1, 605, is expanded to show sub-elements: a disk 1, 702, a disk 2, 704, a disk 5, 706, a port 1, 708, and a port 2, 710, collectively referenced as initiator sub-elements 712. Each of the initiator sub-elements 712 comprises a corresponding health indicator 640.

The expanded view of the fabric entities 525 (FIG. 7B) comprises an expanded view of the fabric 1, 610, displaying a switch 1, 714, with 4 used ports and 0 unused ports. The view of the fabric 2, 615, remains collapsed.

The expanded view of the target entities 530 (FIG. 7C) comprises an expanded view of the subsystem 1, 620, and an expanded view of the subsystem 3, 630. The view of the subsystem 2, 625, remains collapsed. The subsystem 1, 620, comprises a ports sub-element 716 and a volumes sub-element 718. The ports sub-element 716 comprises a port 5, 720, and a port 6, 722. The volumes sub-element 740 comprises a volume 1, 724.

The subsystem 3, 630, comprises a ports sub-element 726 and a volumes sub-element 728. The ports sub-element 726 comprises a port 8, 730. The volumes sub-element 728 comprises a volume, 3, 732.

User 65 selects the disk 5, 715, as the originating endpoint for one or more relationships or data paths to be displayed by system 10. System 10 displays a data path 1, 734, a data path 2, 736, and a data path 3, 738 (shown in FIG. 7B). The data path 1, 734, comprises a segment 1, 740, a segment 2, 742, a segment 3, 744, and a segment 4, 746. The data path 2, 736, comprises the segment 1, 740, the segment 2, 742, a segment 5, 748, and a segment 6, 750. The data path 3, 738, comprises the segment 1, 740, the segment 2, 742, a segment 7, 752, and a segment 8, 754.

User 65 can examine the health of elements and health of sub-elements along a data path and determine whether action is required to improve or restore flow of data along the data path. Different data paths may be selected by selecting various elements or sub-elements. Selecting different elements or sub-elements may change the originating endpoint or introduce and intermediate endpoint. The originating endpoint may be any element in the network displayed in the graphical view 505. Alternatively, user 65 can select a data path to view by selecting a row in the tabular view 510.

By limiting the data path view to only those entities directly involved in the data path, system 10 reduces the navigational and display complexity of a traditional topology viewer. System 10 combines several specialized topology views (called "tiles") shown as a sequence, as well as a textual tabular view. The various views of system 10 provide the low level details required for the task and provide task-based filtering that reduces the number of entities shown to the user to address the scalability issues of such a visualization. A data path view as described herein is a useful facility outside the storage administration domain and the description of system 10 in this context by no means shall limit the generality of the invention for use in such system such as, for example, packet switching systems, process monitoring, or the like.

It is to be understood that the specific embodiments of the invention that have been described are merely illustrative of certain applications of the principle of the present invention. Numerous modifications may be made to the system and method for disclosing relations between entities in support of information technology system visualization and management described herein without departing from the spirit and scope of the present invention.

What is claimed is:

1. A processor-implemented method of disclosing relations between a plurality of entities in support of information technology system visualization and management, comprising:
    selecting at least one entity of the plurality of entities as an initiator entity of a data path;
    selecting the data path or a set of data paths;
    determining an action required to restore flow of data along the data path based on the functional status of the plurality of entities on the data path;
    analyzing a partial portion of the data path connecting the plurality of entities;
    rerouting the partial portion of the data path connecting the plurality of entities when a system configuration is incorrect;
    filtering the data path into a filtered data path that includes a plurality of interconnected entities comprising the initiator entity, at least one fabric entity, and at least one target entity;
    expanding a view of the fabric entity to include both used and unused ports;
    limiting a view of the data path to the plurality of interconnected entities directly involved in the filtered data path;
    displaying the filtered data path of the initiator entity for ease of visualization;
    reducing a number of entities shown to the user through task based filtering;
    displaying details required for a task in the view of the data path; and
    using overlays to display attributes of the filtered data path.

2. The method of claim 1, wherein filtering the data path comprises filtering the initiator entity.

3. The method of claim 2, wherein the initiator entity includes at least one of: a storage entity and a port.

4. The method of claim 1, wherein filtering the data path comprises filtering the fabric entity.

5. The method of claim 4, wherein the fabric entity includes at least one of: a port, a fabric, and a switch.

6. The method of claim 1, wherein filtering the data path comprises filtering the target entity.

7. The method of claim 6, wherein the target entity includes at least one of: a storage entity, a pool, a volume, and a port.

8. The method of claim 1, wherein displaying the filtered data path comprises displaying a relationship between the interconnected entities in a graphical view.

9. The method of claim 1, including:
    wherein displaying the filtered data path comprises displaying a relationship between the interconnected entities in a tabular view.

10. The method of claim 1, further comprising identifying a problem along the filtered data path by identifying at least one affected entity of the interconnected entities that reflect the problem.

11. The method of claim 10, further comprising selecting the affected entity and addressing the problem.

12. The method of claim 1, wherein displaying the filtered data path comprises exclusively displaying the interconnected entities associated with the initiator entity.

13. A hardware processor-implemented system for disclosing relations between entities in support of information technology system visualization and management, comprising:
   a selector that selects, by performance of a computer processor-implemented system, at least one entity of a plurality of entities as an initiator entity of a data path;
   a filter that filters the data path into a filtered data path that includes a plurality of interconnected entities comprising the initiator entity, at least one fabric entity, and at least one target entity;
   a determiner that determines an action required to restore flow of data along the data path based on the functional status of the plurality of entities on the data path;
   an analyzer that analyzes a partial portion of the data path connecting the plurality of entities;
   a health indicator that provides an aggregate of the health of multiple ports;
   a sorter that sorts paths by throughput in a section of the data path;
   a path selector that selects the filtered data path from a row in a tabular view;
   a rerouter that reroutes the partial portion of the data path connecting the plurality of entities when a system configuration is incorrect;
   an attribute determiner that dynamically determines attributes for display based on attributes extracted from each of the plurality of entities; and
   a displayer that displays the filtered data path of the initiator entity for ease of visualization.

14. The system of claim 13, wherein the filter filters the initiator entity.

15. The system of claim 14, wherein the initiator entity includes at least one of: a storage entity and a port.

16. The system of claim 13, wherein the filter filters the fabric entity.

17. The system of claim 16, wherein the fabric entity includes at least one of: a port, a fabric, and a switch.

18. The system of claim 13, wherein the filter filters the target entity.

19. The system of claim 18, wherein the target entity includes at least one of: a storage entity, a pool, a volume, and a port.

20. The system of claim 13, wherein the displayer displays a relationship between the interconnected entities in a graphical view.

21. The system of claim 13, wherein the displayer displays a relationship between the interconnected entities in a tabular view.

22. The system of claim 13, further comprising an identifier that identifies a problem along the data path by identifying at least one affected entity of the interconnected entities that reflect the problem.

23. The system of claim 22, further comprising an entity selector that selects the affected entity and addresses the problem.

24. The system of claim 13, wherein the displayer exclusively displays the interconnected entities associated with the initiator entity.

25. A computer program product having a plurality of executable instruction codes stored on a non-transitory computer usable storage medium, for disclosing relations between entities in support of information technology system visualization and management, comprising:
   a set of instruction codes for selecting at least one entity of a plurality of entities as an initiator entity of a data path;
   a set of instruction codes for filtering the data path into a filtered data path that includes a plurality of interconnected entities comprising the initiator entity, at least one fabric entity, and at least one target entity;
   a set of instruction codes for displaying the filtered data path of the initiator entity for ease of visualization;
   a set of instruction codes for providing an assessable representation of the filtered data path for a visually impaired user;
   a set of instruction codes for limiting the view of the data path to entities directly involved in the filtered data path;
   a set of instruction codes for displaying a segment of the filtered data path of the initiator entity as a table;
   a set of instruction codes for displaying entities on the filtered data path according to user defined types;
   a set of instruction codes that displays attributes of each of the entities including operating system type, operating system patch level, machine type, physical location, installed memory capacity, and free disk space;
   a set of instruction codes that creates multiple topology views of the data path; and
   a set of instruction codes that combines the multiple topology views with the tabular view of the data path as a sequence.

26. The computer program product of claim 25, wherein the set of instruction codes for filtering the data path filters the initiator entity.

27. The computer program product of claim 26, wherein the initiator entity includes at least one of: a storage entity and a port.

28. The computer program product of claim 25, wherein the set of instruction codes for filtering the data path filters the fabric entity.

29. The computer program product of claim 28, wherein the fabric entity includes at least one of: a port, a fabric, and a switch.

30. The computer program product of claim 25, wherein the set of instruction codes for filtering the data path filters the target entity.

31. The computer program product of claim 30, wherein the target entity includes at least one of: a storage entity, a pool, a volume, and a port.

32. The computer program product of claim 25, wherein the set of instruction codes for displaying the filtered data path displays a relationship between the interconnected entities in a graphical view.

33. The computer program product of claim 25, wherein the set of instruction codes for displaying the filtered data path displays a relationship between the interconnected entities in a tabular view.

34. The computer program product of claim 25, further comprising a set of instruction codes for identifying a problem along the data path by identifying at least one affected entity of the interconnected entities that reflect the problem.

35. The computer program product of claim 34, further comprising a set of instruction codes for selecting the affected entity and addressing the problem.

* * * * *